(12) United States Patent
Lee et al.

(10) Patent No.: US 6,510,042 B1
(45) Date of Patent: Jan. 21, 2003

(54) METAL OXIDE ELECTROCHEMICAL PSEUDOCAPACITOR HAVING CONDUCTING POLYMER COATED ELECTRODES

(75) Inventors: Hee-Young Lee, Seoul (KR); Heui-Soo Kim, Seoul (KR); Sun-Wook Kim, Seoul (KR)

(73) Assignee: Ness Capacitor Co., Ltd., Suwon-si (KR)

( * ) Notice: Subject to any disclaimer, the term of this patent is extended or adjusted under 35 U.S.C. 154(b) by 0 days.

(21) Appl. No.: 09/963,650

(22) Filed: Sep. 27, 2001

(30) Foreign Application Priority Data

Jul. 13, 2001 (KR) .............................. 01-42427

(51) Int. Cl.$^7$ .......................... H01G 9/00; H01G 9/145
(52) U.S. Cl. ................. 361/502; 361/503; 361/508; 361/516
(58) Field of Search ................. 361/502–504, 361/508–512, 516, 523–541

(56) References Cited

U.S. PATENT DOCUMENTS 5,824,436 A * 10/1998 Lian et al. ............. 252/519.34
5,982,609 A * 11/1999 Evans ........................ 361/516

* cited by examiner

*Primary Examiner*—Anthony Dinkins
*Assistant Examiner*—Eric Thomas
(74) *Attorney, Agent, or Firm*—Jacobson Holman PLLC (57) ABSTRACT

Disclosed are a conducting polymer coated electrode of a metal oxide electrochemical pseudocapacitor having an improved performance and a method of manufacturing the same. The electrode includes a current collector and an active material coated on the current collector. The active material includes metal oxide and is coated with a conducting polymer on a surface thereof. Metal oxide electrochemical pseudocapacitor includes a plurality of electrodes described above, an electrolyte and a separator positioned between the electrodes to prevent a contact between the electrodes. The metal oxide pseudocapacitor including the electrode coated with the conducting polymer having a high electric conductivity, has an increased storing amount of electric energy and a decreased ESR to improve a high power performance.

8 Claims, 9 Drawing Sheets

METAL OXIDE ELECTROCHEMICAL PSEUDOCAPACITOR HAVING CONDUCTING POLYMER COATED ELECTRODES

BACKGROUND OF THE INVENTION

1. Field of the Invention

The present invention relates to a conducting polymer coated electrode of a metal oxide electrochemical pseudocapacitor and a method of manufacturing the same, and more particularly, to a conducting polymer coated electrode of a metal oxide electrochemical pseudocapacitor having an improved quality by coating a conducting polymer having a high electric conductivity and a method of manufacturing the same.

2. Description of the Related Arts

A metal oxide electrochemical pseudocapacitor lies in a field different from any field of a lithium rechargeable battery, an electrical double layer capacitor (EDLC) and a conducting polymer capacitor.

The metal oxide electrochemical pseudocapacitor has similar characteristics as those of a capacitor with the EDLC and the conducting polymer capacitor. That is, electrochemically, a large amount of electric energy is charged/recharged in a rapid time period. Meantime, the metal oxide electrochemical pseudocapacitor has similar characteristics to the lithium rechargeable battery. That is, a metal oxide is used as an active material of an electrode.

The metal oxide electrochemical pseudocapacitor will be described in detail below.

Supercapacitor or ultracapacitor is a kind of the capacitor which can storing tens times to thousands times of electric energy in a unit volume when compared with an aluminum electrolytic capacitor employing the conventional aluminum foil as an electrode. The supercapacitor typically includes three types of an EDLC, a metal oxide electrochemical pseudocapacitor and a conducting polymer capacitor. Technically and commercially, the EDLC attains superiority among them. The EDLC employs an active material of an electrode, having a wide surface area such as active carbon. Electric double layer phenomenon formed at the contacting portion of the surface of the electrode material and an electrolyte becomes the basic source of the energy storage.

The basic energy storing source of the metal oxide electrochemical pseudocapacitor is an electrochemical reaction produced from metal oxide such as a battery. The difference with the lithium rechargeable battery lies in the electrochemical characteristic differences of the general battery and the capacitor. That is, the battery shows a plateau portion in a graph obtained by designating voltage with time, at a constant voltage during charge/discharge. However, the metal oxide electrochemical pseudocapacitor shows a straight line.

The term of "pseudocapacitor" comes from the following reason. The characteristic of the capacitor is obtainable from the formation of the electric double layer as in the EDLC or the aluminum electrolytic capacitor and is hard to obtain from the electrochemical reaction. However, some kinds of metal oxides do not show the characteristics of the battery but the characteristics of the capacitor. That is, the reaction of the metal oxide electrochemical pseudocapacitor concerning the energy storage is similar to that of the battery, however, the characteristics of the metal oxide pseudocapacitor are similar to those of the capacitor. From this point of view, the term of "pseudo" is applied for the meaning of imitation or similarity.

The metal oxide electrochemical pseudocapacitor and the lithium rechargeable capacitor will be compared as follows. They are similar to each other in using metal oxide as the electrode and in using the electrochemical reaction as the energy storage means. However, they show quite different electrochemical characteristics when considering voltage-current-time parameters. For example, the lithium rechargeable capacitor illustrates various peaks in a current-voltage curve, however, the metal oxide electrochemical pseudocapacitor show a shape similar to a tetragon in the same curve.

Now, the metal oxide electrochemical pseudocapacitor and the EDLC or the conducting polymer capacitor will be compared as follows. The electrochemical characteristics of the metal oxide electrochemical pseudocapacitor and the EDLC are similar. In addition, the current-voltage characteristic curve and the voltage-time curve according to the charge/discharge are the same. However, the reaction mechanisms concerning the energy storage are quite different. Also, they use different active materials as an active carbon and metal oxide. The electrochemical characteristics of the conducting polymer capacitor and the metal oxide electrochemical pseudocapacitor also are similar. However, different from the metal oxide electrochemical pseudocapacitor, the conducting polymer capacitor uses the conducting polymer as the electrode.

Generally, the metal oxide pseudocapacitor uses metal oxide as the active material of the electrode. The active material is required to have a high electric conductivity. When the electric conductivity is low, the equivalent series resistance (ESR) of the capacitor increases and the performance at a high output power is deteriorated. In addition, the degree of the practical usage of the active material is lowered and the energy density is decreased. Accordingly, in general, carbon is mixed as a conductive agent. The electrode is manufactured by mixing the active material and carbon as the basic material along with a solvent such as alcohol, water, etc. to obtain a slurry and then by coating the slurry on a current collector.

However, according to the conventional method of manufacturing the electrode, the conducting carbon is mixed. In this case, the carbon should keep a continuous contact from the current collector to each portion of the electrode without a break in order to exhibit a good effect. The continuousness depends on the mixing method and the degree of dispersion of both of the active material of metal oxide and the conducting carbon. The maintenance of the degree of dispersion is very difficult.

The electrochemical reaction which can accomplish the characteristics of the pseudocapacitor occurs at a place where three kinds of reactants meet. The three reactants are a working ion present in an electrolyte, an electron participating in the electrochemical reaction and a surface of the active material which plays the role of a catalyst. The place satisfying this condition is called as an active site. From the view point of forming the active site, the degree of the dispersion of the carbon and the active material is in a close relation with the performance of the capacitor. When mixing the active material and the conducting carbon in order to manufacture the electrode of the capacitor, the degree of the dispersion of the above two materials depends on the mixing condition. Ideally, carbon should make close contact with the current collector in a wide area and the contact between them should be continuous in a chain form without a break. In addition, the carbon chain should make contact with the surface of the active material through an area as wide as possible.

In the electrode manufactured by the above-described method, carbon functions connecting the flow of the electrons initiated from the current collector to the active material so that the electrons participate in the electrochemical reaction occurring at the active material. Accordingly, when the degree of the dispersion of the active material and carbon is not good, the active site decreases to decrease the energy density. In addition, the resistance of the capacitor increases due to the defect of connection between carbon molecules to deteriorate the characteristics of the capacitor at a high output power.

Even when the connecting chain between carbon is good in the electrode owing to the high degree of the dispersion, the resistance generated through a passage of electrons along a grain boundary which is a boundary formed between carbon particles forming the carbon connecting chain, cannot be completely eliminated. Therefore, a method for decreasing the dependency of the electrode performance on the degree of the dispersion and the resistance due to the carbon chain is required.

Meantime, a lithium rechargeable battery using an electrode coated with conducting polymer has been reported as follows. See F. Coustier, D. B. Le, S. Passerini and W. H. Smyrl, "High Surface Area $V_2O_5$ as Host Material for Lithium Intercalation", in the proceedings of the Symposium on Electrode Materials and Processes for Energy Conversion and Storage IV, J. McBreen, S. Mukerjee and S. Srinivasan, Editors, The Electrochemical Society Proceedings Series, PV97-13, Pennington, N.J. (1997). However, an application of the metal oxide electrochemical pseudocapacitor different from the principle of the lithium rechargeable capacitor has not been reported.

SUMMARY OF THE INVENTION

It is an object of the present invention considering the above-described problems, to provide an electrode having an increased specific capacitance by coating conducting polymer having a high electric conductivity onto the conventional metal oxide electrode.

Another object of the present invention is to provide a capacitor having an increased storage capacity of an electric energy and an improved performance at a high output power by reducing an equivalent series resistance.

Another object of the present invention is to provide an advantageous method of manufacturing an electrode described above.

To accomplish the object, there is provided in the present invention an electrode of a metal oxide electrochemical pseudocapacitor comprising a current collector and an active material coated on the current collector. The active material includes metal oxide and is coated with a conducting polymer on a surface thereof.

Particularly, the conducting polymer is at least one selected from the group consisting of polypyrrole, polyaniline and polythiophene.

In addition, the current collector preferably includes the conductive material coated on a surface thereof. More preferably, carbon is used as the conductive material. Further, the active material includes manganese dioxide as a main component and more preferably, includes amorphous manganese dioxide as a main component.

Another object of the present invention can be accomplished by a metal oxide electrochemical pseudocapacitor comprising a plurality of electrodes, an electrolyte and a separator positioned between the electrodes to prevent a contact between said electrodes. The electrode comprises a current collector and an active material coated on said current collector. The active material includes metal oxide and is coated with a conducting polymer on a surface thereof.

As for the electrolyte, at least one selected from the group consisting of potassium chloride (KCl), potassium sulfate ($K_2SO_4$), lithium chloride (LiCl), lithium sulfate ($Li_2SO_4$), sodium chloride (NaCl) and sodium sulfate ($Na_2SO_4$) is preferably used.

Further another object of the present invention is accomplished by a method of manufacturing an electrode of a metal oxide electrochemical pseudocapacitor comprising the following steps. First, an active material is coated on a current collector. A mixture is prepared by mixing a monomer of a conducting polymer and a solvent and an additive is added into thus prepared mixture. Then, the current collector coated with the active material is dipped into thus obtained mixture. After that, the monomer is polymerized to coat the conducting polymer on the current collector coated with the active material.

As for the solvent, at least one selected from the group consisting of distilled water, PC (propylene carbonate) and ACN (acetonitrile) is preferably used. As for the additive, at least one selected from the group consisting of Sodium salt of para-toluenesulfonic acid and TEATFB (tetraethyl ammonium tetrafluoro borate, $(CH_3CH_2)_4NBF_4$) can be used.

The polymerization can be implemented through an electrochemical reaction. At this time, the polymerization is implemented by keeping a current density of about 0.1–10 $mA/cm^2$ for about one minute to 24 hours. Otherwise, the polymerization can be implemented by keeping a voltage of about 0.5–1.0V for about one minute to 24 hours.

The polymerization also can be implemented by adding an oxidizing agent. At this time, ammonium sulfate is preferably used.

To accomplish further another object, there also is provided in the present invention a method of manufacturing an electrode of a metal oxide electrochemical pseudocapacitor comprising the following steps.

First, a first solution in which an active material is dispersed, is prepared. A second solution in which a monomer of a conducting polymer, a solvent and an additive are mixed, is prepared. Then, the first and second solution are mixed and stirred. An oxidizing agent is added into thus obtained mixture to polymerize the monomer and to coat the conducting polymer on the active material. Then, thus obtained active material coated with the conducting polymer is coated onto a current collector.

According to the present invention, a conducting polymer is coated on the surface of the electrode or metal oxide powder of the conventional metal oxide electrochemical pseudocapacitor to decrease ESR which is an important characteristic of a capacitor and improve high power performance. In addition, the active site where the electrochemical reaction occurs is increased to increase energy density.

BRIEF DESCRIPTION OF THE DRAWINGS

The above objects and advantages of the present invention will become more apparent by describing preferred embodiments in detail with reference to the attached drawings in which.

DESCRIPTION OF THE PREFERRED EMBODIMENT

The present invention will be explained in more detail below.

According to the present invention, a conducting polymer is coated by a chemical or electrochemical method onto an electrode manufactured by coating an active material or a mixture of the active material and carbon by utilizing a binder and a solvent. The conducting polymer itself has a high electric conductivity. When the conducting polymer is coated on the electrode wherein the degree of the dispersion of the active material and carbon is not good, the coated conducting polymer onto the electrode functions to connect the surface of the active material separated from the carbon chain. Accordingly, the number of the active site is increased to improve the energy density.

The connection of the separated portion of the carbon chain which is obtained through a connection of a plurality of carbon molecules, might lower the total resistance of the capacitor. Even when the degree of the dispersion of the active material and carbon is good, an effect of lowering of the resistance at the grain boundary can be obtained through coating the conducting polymer on the connecting portion of the grains. Further, since the surface area of the active material onto which electrons might contact is increased, the energy density also can be increased.

As for the method of coating the conducting polymer onto the electrode composed of the active material or a mixture of the active material with carbon, chemical coating, electrochemical coating, etc. can be applied. The chemical coating method will be applied as follows. The monomer which is a unit composing the conducting polymer, is mixed with a solvent in which the active material particles are dispersed. At this state, an oxidizing agent is used to carry out a polymerization reaction and to form the conducting polymer at the surface of the active material particles. Alternately, an electrode coated with the active material or a mixture of the active material and carbon is dipped into a solution in which the monomer of the conducting polymer is dissolved. Then, an oxidizing agent is added to carry out the polymerization reaction and to form the conducting polymer at the surface of the electrode.

The electrochemical coating method will be described below. An electrode coated with the active material or a mixture of the active material and carbon is dipped into a solution in which the monomer of the conducting polymer is dissolved. Then, a constant voltage or current is applied by using a power supply to electrochemically oxidize the monomer and to form the conducting polymer at the surface of the electrode.

The difference between the chemical coating and the electrochemical coating lies in the oxidizing method when the polymerization of the monomer is to proceed. However, in both methods, the polymerization is carried out at all the portions where the electrode and the electrolyte make contact with each other.

The method of manufacturing the electrode of the metal oxide electrochemical pseudocapacitor according to the present invention will be described in detail, below.

First, the electrode of the present invention can be manufactured by coating the conducting polymer onto a previously manufactured electrode of the metal oxide pseudocapacitor. One of two methods using a chemical reaction or electrochemical reaction can be applied. Next, the conducting polymer is coated on the active material by a chemical reaction before the manufacture of the electrode. Then, the electrode is manufactured. These typical three methods will be described in detail.

First, the method of coating the conducting polymer onto the electrode by utilizing the electrochemical reaction is as follows.

An active material of metal oxide such as amorphous manganese dioxide and a conductive material such as conductive carbon are mixed in an appropriate ratio by weight. Then, thus obtained mixture is mixed with a binder and a solvent to prepare a slurry. The slurry is coated onto a current collector such as titanium foil and then is dried to manufacture an electrode.

The monomer of the conducting polymer such as pyrrole monomer, aniline monomer, thiophene monomer is added to a solvent such as distilled water, PC, AcN, and the like and then is stirred until it becomes homogeneous. Into thus obtained homogeneous solution, an additive (or a dopant) such as Sodium salt of para-toluenesulfonic acid or TEATFB (tetraethyl ammonium tetrafluoro borate, $(CH_3CH_2)_4NBF_4$) is added in a concentration of about 0.1M and thus obtained solution is stirred for a complete dissolution.

The electrode of the metal oxide pseudocapacitor is dipped into thus obtained solution and is stood for a sufficient time so that the solution penetrates into the inner portion of the electrode.

After dipping the electrode for a sufficient time into the solution, the polymerization reaction is initiated by a constant current method by which the current density of 0.1–10 $mA/cm^2$ is kept for about one minute to 24 hours or a constant voltage method by which the voltage of 0.5–1.0 V with respect to the reference electrode of Ag/AgCl is kept for about one minute to 24 hours.

After completing the polymerization reaction, the electrode is washed with distilled water, PC or AcN for several times. Then, the electrode is dried at room temperature for a sufficient time to thereby give the electrode coated with the conducting polymer.

Next, the method of coating the conducting polymer onto the electrode by utilizing the chemical reaction will be described.

An active material of metal oxide such as amorphous manganese dioxide and a conductive material such as conductive carbon are mixed in an appropriate ratio by weight. Then, thus obtained mixture is mixed with a binder and a solvent to prepare a slurry. The slurry is coated onto a current collector such as titanium foil and then is dried to manufacture an electrode.

The monomer of the conducting polymer such as pyrrole monomer, aniline monomer, thiophene monomer is added to a solvent such as distilled water, PC, AcN, and the like and then is stirred until it becomes homogeneous. Into thus obtained homogeneous solution, an additive such as sodium salt of para-toluenesulfonic acid or TEATFB is added in a concentration of about 0.1M and thus obtained solution is stirred for a complete dissolution.

The electrode of the metal oxide pseudocapacitor is dipped into thus obtained solution and is stood for a sufficient time so that the solution penetrates into the inner portion of the electrode.

Into the solution in which the electrode is dipped, ammonium sulfate as an oxidizing agent is added to polymerize the monomer of the conducting polymer. The solution is stirred for about 5 hours to carry out the polymerization reaction. After completing the polymerization reaction, the electrode is washed for several times with distilled water, PC, AcN, etc. Then, the electrode is dried at room temperature for a sufficient time period to manufacture the electrode coated with the conducting polymer.

Thirdly, the coating method on the surface of the active material with the conducting polymer will be described.

The monomer of the conducting polymer such as pyrrole monomer, aniline monomer, thiophene monomer is added to a solvent such as distilled water, PC, AcN, and the like and then is stirred until it becomes homogeneous. Into thus obtained homogeneous solution, an additive such as sodium salt of para-toluenesulfonic acid or TEATFB is added in a concentration of about 0.1M and thus obtained solution is stirred for a complete dissolution.

Then, the metal oxide used as the active material such as amorphous manganese dioxide is added to distilled water and is stirred for a sufficient dispersion.

Thus obtained two solutions are mixed and then stirred for a while. After completing the stirring, 1.0M of aqueous ammonium sulfate solution is added as an oxidizing agent to polymerize the monomer of the conducting polymer. The solution is stirred for about 5 hours to complete the polymerization and to coat the conducting polymer on the surface of the active material.

After completing the polymerization, the powder is filtered, washed with distilled water for several times and dried at room temperature.

Hereinafter, preferred examples of the present invention will be described with reference to the attached drawings.

EXAMPLE 1

Amorphous manganese dioxide and conductive carbon were mixed in a mixing ratio of 8:2 by weight and thus obtained mixture was mixed with an NMP solution in which 15% by weight of PVdF was dissolved to prepare a slurry. The slurry was coated on a current collector of a titanium foil having a size of 3cm×3cm and was completely dried in a drier to manufacture an electrode.

Pyrrole monomer was completely dissolved in a PC solution so that the concentration of thus obtained solution was 0.3M. Sodium salt of para-toluenesulfonic acid was added as an additive into thus obtained solution and was stirred for a complete dissolution. The amount of the sodium salt of para-toluenesulfonic acid was controlled to obtain a 0.1M solution.

A previously prepared electrode of the metal oxide pseudocapacitor was dipped into thus obtained solution and was stood for a sufficient time in order to the solution might completely penetrate into the inner portion of the electrode.

After that, a polymerization reaction was carried out by a constant current method by which the current density of 0.5 mA/cm$^2$ was kept for about 10 minutes. After completing the polymerization reaction, the electrode was washed with the PC solution for several times and was dried at room temperature to manufacture an electrode coated with the conducting polymer. The performance of the electrode was measured.

Figure 1:
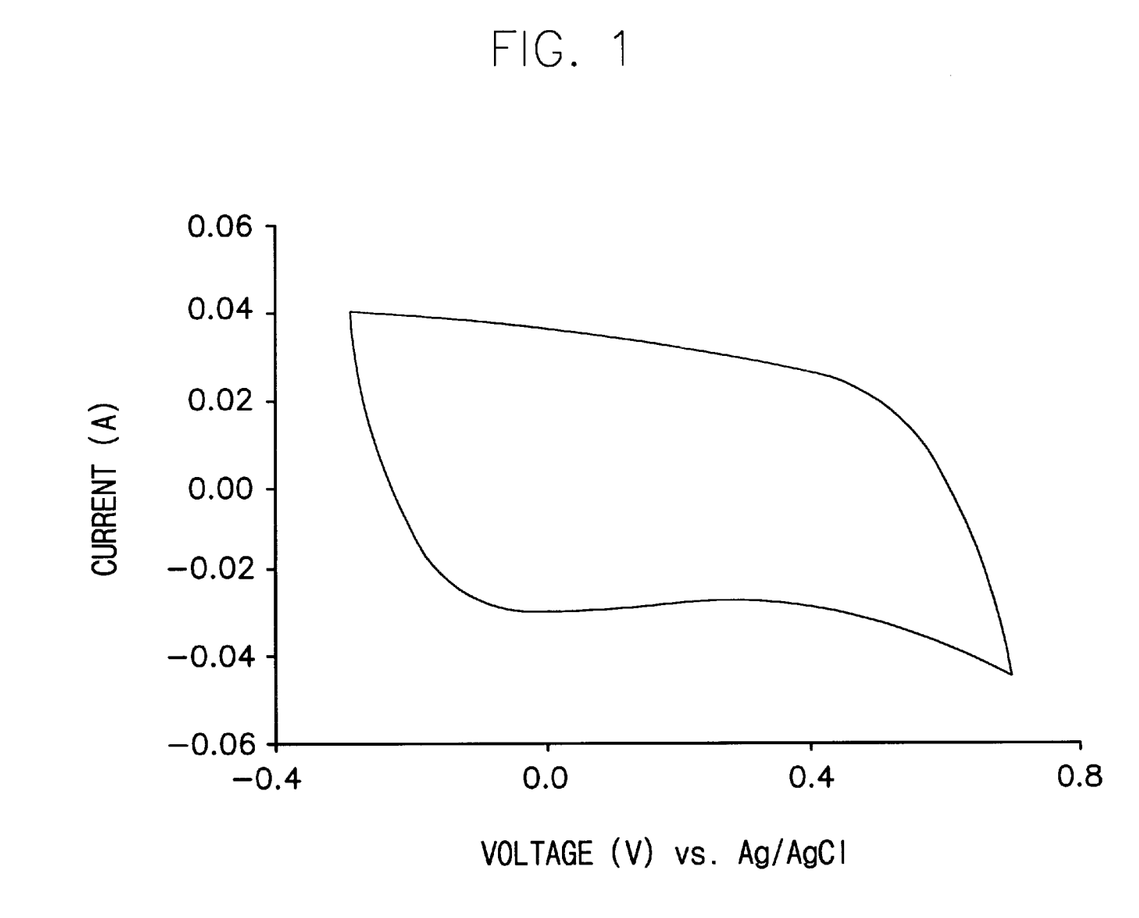
FIG. 1 is a graph illustrating a CV measuring result by using an electrode manufactured by Example 1 with a reference electrode of Ag/AgCl.

FIG. 1 is a graph illustrating a current-voltage characteristic (CV; cyclic voltammograms) measuring result by using an electrode manufactured by Example 1 when using an electrolyte of 1.0M aqueous potassium chloride solution, a counter electrode of platinum mesh and a reference electrode of Ag/AgCl. Even though an ideal tetragon-shaped graph illustrating the current-voltage characteristic is not obtained, a closely resemble tetragon-shaped graph is obtained. In addition, it is confirmed that a high specific capacitance of 350 F/g can be obtained.

EXAMPLE 2

An electrode coated with the conducting polymer was manufactured by implementing the same method described in Example 1, except that the pyrrole monomer was dissolved in distilled water instead of the PC solution and the electrode after completing the polymerization reaction was washed with distilled water instead of the PC solution.

EXAMPLE 3

An electrode coated with the conducting polymer was manufactured by implementing the same method described in Example 1, except that the pyrrole monomer was dissolved in AcN solution instead of the PC solution and the electrode after completing the polymerization reaction was washed with AcN solution instead of the PC solution.

Specific capacitances of the electrodes manufactured by Examples 1, 2 and 3 and by using different solutions during the coating of the conducting polymer are illustrated in the following Table 1. As can be noted from Table 1, the highest specific capacitance is obtained when using the AcN solution during implementing the electrochemical coating of the conducting polymer.

TABLE 1

|  | Example 1 | Example 2 | Example 3 |
|---|---|---|---|
| Solvent | PC | Distilled water | AcN |
| Specific capacitance (F/g) | 350 | 380 | 480 |

EXAMPLE 4

An electrode coated with the conducting polymer was manufactured by implementing the same method described in Example 3, except that TEATFB was used as the additive instead of the sodium salt of para-toluenesulfonic acid.

Specific capacitances of the electrodes manufactured by Examples 3 and 4 and by using different additives are illustrated in the following Table 2. As known from Table 2, the highest specific capacitance is obtained when using TEATFB instead of the sodium salt of para-toluenesulfonic acid as the additive.

TABLE 2

|  | Example 3 | Example 4 |
|---|---|---|
| Additive | Sodium salt of para-toluenesulfonic acid | TEATFB |
| Specific capacitance (F/g) | 480 | 600 |

EXAMPLES 5–9

Electrodes coated with the conducting polymer were manufactured by implementing the same method described in Example 4, except that the concentration of TEATFB was 0.01M (Example 5), 0.05M (Example 6), 0.5M (Example 7), 1.0M (Example 8) and 2.0M (Example 9) instead of 0.1M.

Figure 2:
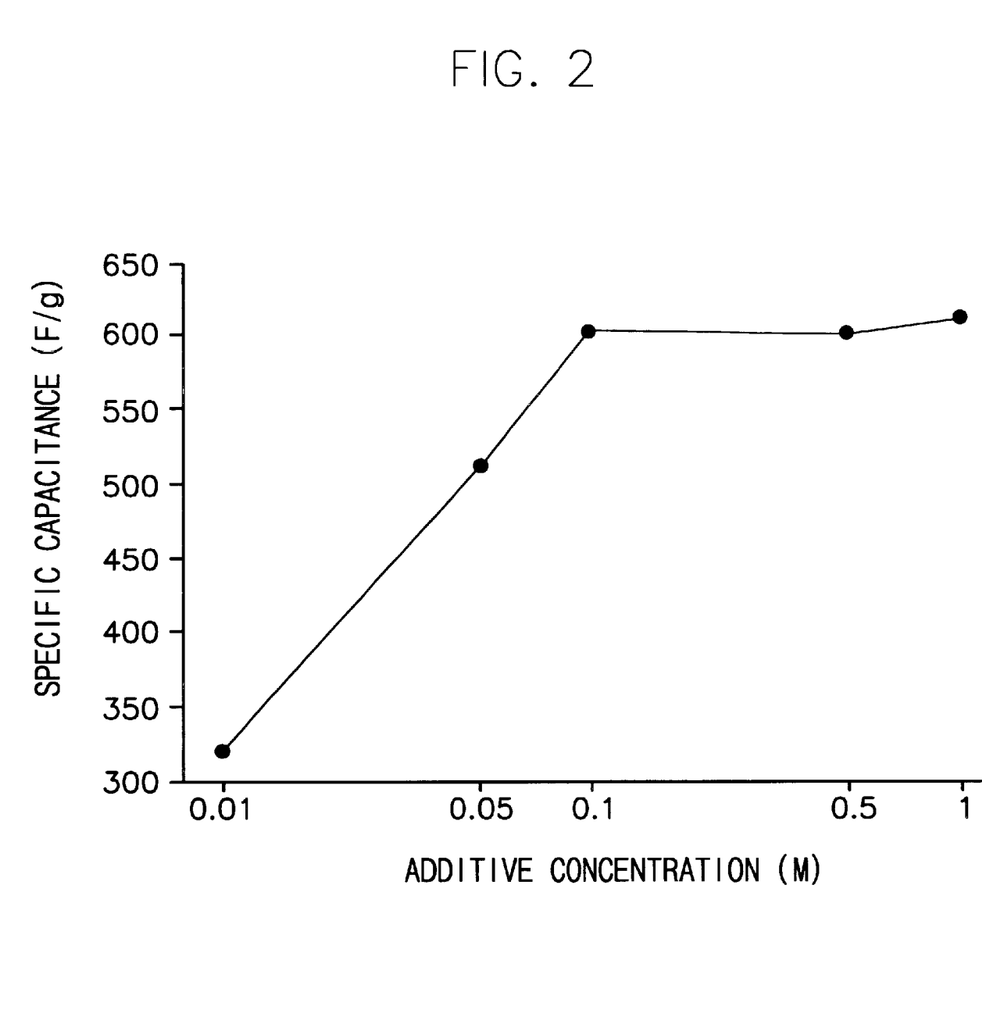
FIG. 2 is a graph illustrating specific capacitance values of electrodes manufactured by using an additive having different concentrations according to Examples 4–9.

FIG. 2 is a graph illustrating specific capacitance values of the electrodes manufactured by using an additive having different concentrations according to Examples 4–9. As known from FIG. 2, the change of the specific capacitance according to the concentration of the additive above 0.1M is not significant.

EXAMPLE 10

An electrode coated with the conducting polymer was manufactured by implementing the same method described in Example 4, except that aniline monomer was used instead of the pyrrole monomer.

EXAMPLE 11

An electrode coated with the conducting polymer was manufactured by implementing the same method described in Example 4, except that thiophene monomer was used instead of the pyrrole monomer.

Specific capacitances of the electrodes manufactured by Examples 4, 10 and 11 and coated with different conducting polymers are illustrated in the following Table 3. As known from Table 3, the highest specific capacitance is obtained when employing polypyrrole as the conducting polymer.

TABLE 3

|  | Example 4 | Example 10 | Example 11 |
|---|---|---|---|
| Conducting polymer | Polypyrrole | Polyaniline | Polythiophene |
| Specific capacitance (F/g) | 600 | 273 | 185 |

EXAMPLE 12

An electrode coated with the conducting polymer was manufactured by implementing the same method described in Example 4, except that the polymerization reaction was implemented by a constant current method by which the current density of 0.1 mA/cm$^2$ was applied for 60 minutes instead of 0.5 mA/cm$^2$ for 10 minutes.

EXAMPLE 13

An electrode coated with the conducting polymer was manufactured by implementing the same method described in Example 12, except that the polymerization reaction was implemented by a constant current method by which the current density of 1 mA/cm$^2$ was applied instead of 0.1 mA/cm$^2$.

EXAMPLE 14

An electrode coated with the conducting polymer was manufactured by implementing the same method described in Example 12, except that the polymerization reaction was implemented by a constant current method by which the current density of 5 mA/cm$^2$ was applied instead of 0.1 mA/cm$^2$.

EXAMPLE 15

An electrode coated with the conducting polymer was manufactured by implementing the same method described in Example 12, except that the polymerization reaction was implemented by a constant current method by which the current density of 10 mA/cm$^2$ was applied instead of 0.1 mA/cm$^2$.

Figure 3:
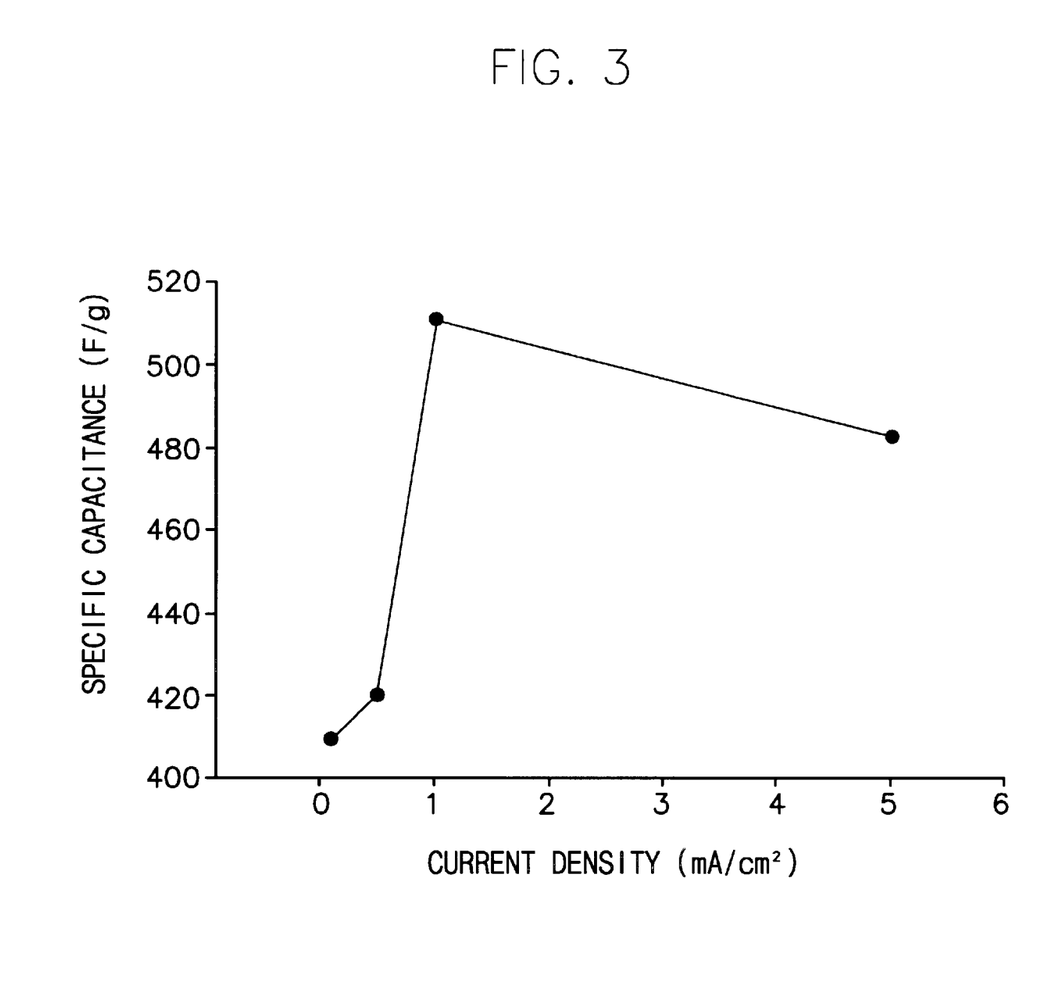
FIG. 3 is a graph illustrating specific capacitance values of electrodes obtained by changing current densities according to Examples 12–15.

FIG. 3 is a graph illustrating specific capacitance values of the electrodes obtained by changing current densities according to Examples 12–15. The specific capacitances were measured in a 1M of aqueous potassium chloride solution. As known from FIG. 3, the highest specific capacitance is obtained when applying the current density of 1.0 mA/cm$^2$.

EXAMPLE 16

An electrode coated with the conducting polymer was manufactured by implementing the same method described in Example 13, except that the polymerization reaction was implemented by a constant current method by which the current density was applied for 1 minute instead of 60 minutes.

EXAMPLE 17

An electrode coated with the conducting polymer was manufactured by implementing the same method described in Example 13, except that the polymerization reaction was implemented by a constant current method by which the current density was applied for 5 minutes instead of 60 minutes.

EXAMPLE 18

An electrode coated with the conducting polymer was manufactured by implementing the same method described in Example 13, except that the polymerization reaction was implemented by a constant current method by which the current density was applied for 10 minutes instead of 60 minutes.

EXAMPLE 19

An electrode coated with the conducting polymer was manufactured by implementing the same method described in Example 13, except that the polymerization reaction was implemented by a constant current method by which the current density was applied for 30 minutes instead of 60 minutes.

EXAMPLE 20

An electrode coated with the conducting polymer was manufactured by implementing the same method described in Example 13, except that the polymerization reaction was implemented by a constant current method by which the current density was applied for 120 minutes instead of 60 minutes.

EXAMPLE 21

An electrode coated with the conducting polymer was manufactured by implementing the same method described in Example 13, except that the polymerization reaction was implemented by a constant current method by which the current density was applied for 240 minutes instead of 60 minutes.

the following Table 4. As can be noted from Table 4, the highest specific capacitance is obtained when potassium sulfate was used as for the salt of the electrolyte.

TABLE 4

| Example | Example 9 | Example 22 | Example 23 | Example 24 | Example 25 | Example 26 |
|---|---|---|---|---|---|---|
| Electrolyte | KCl | $K_2SO_4$ | LiCl | $Li_2SO_4$ | NaCl | $Na_2SO_4$ |
| Specific capacitance (F/g) | 620 | 685 | 577 | 612 | 603 | 644 |

Figure 4:
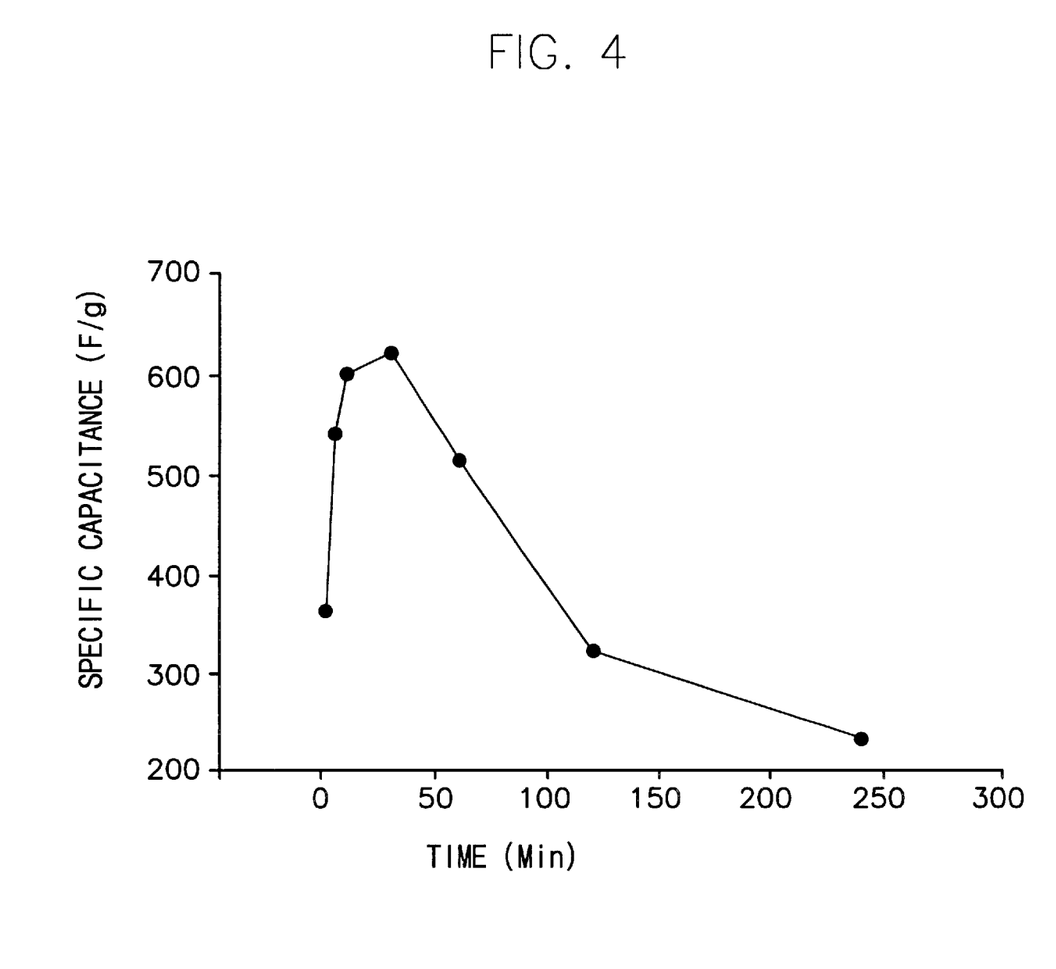
FIG. 4 is a graph illustrating specific capacitance values of electrodes obtained by changing current applying time according to Examples 13 and 16–21.

FIG. 4 is a graph illustrating specific capacitance values of the electrodes obtained by fixing the current density to 1.0 mA/cm$^2$ while changing the current applying time according to Examples 13 and 16–21. The specific capacitances were measured in a 1M aqueous potassium chloride (KCl) solution. As can be noted from FIG. 4, it is confirmed that the highest capacitance is obtained when the current was applied for 30 minutes.

Figure 5:
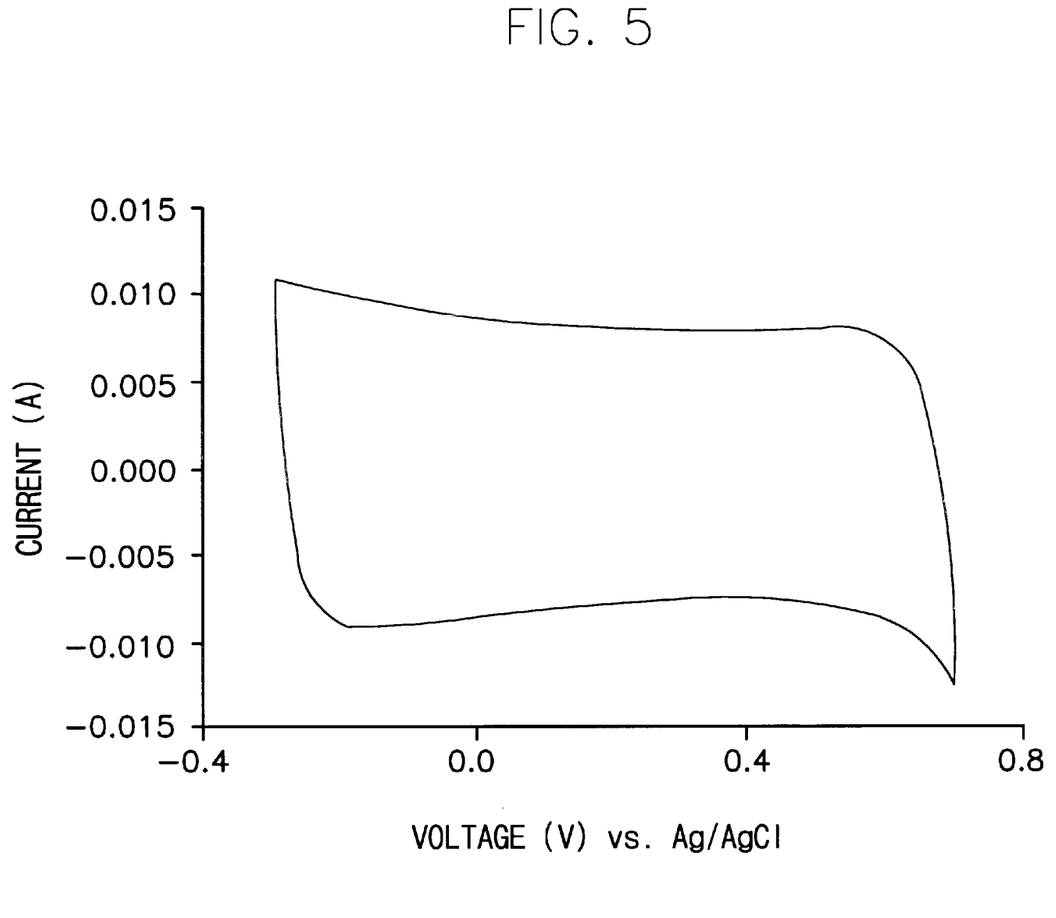
FIG. 5 is a graph illustrating a CV measuring result by using an electrode manufactured by Example 19 with a reference electrode of Ag/AgCl.

FIG. 5 is a graph illustrating a CV measuring result when applying the current density of 1.0 mA/cm$^2$ for 30 minutes onto the electrode manufactured by Example 19 with a reference electrode of Ag/AgCl. As can be noted from FIG. 5, a tetragon-shaped current-voltage curve of an ideal capacitor is obtained.

EXAMPLE 22

An electrode coated with the conducting polymer was manufactured by implementing the same method described in Example 19. Potassium sulfate ($K_2SO_4$) was used instead of potassium chloride (KCl) as the salt in the electrolyte in order to measure the performance of an electrochemical pseudocapacitor including the electrode.

EXAMPLE 23

The same measuring method was implemented as described in Example 22, except that lithium chloride (LiCl) was used instead of potassium sulfate ($K_2SO_4$).

EXAMPLE 24

The same measuring method was implemented as described in Example 22, except that lithium sulfate ($Li_2SO_4$) was used instead of potassium sulfate ($K_2SO_4$).

EXAMPLE 25

The same measuring method was implemented as described in Example 22, except that sodium chloride (NaCl) was used instead of potassium sulfate ($K_2SO_4$).

EXAMPLE 26

The same measuring method was implemented as described in Example 22, except that sodium sulfate ($Na_2SO_4$) was used instead of potassium sulfate ($K_2SO_4$).

Specific capacitances obtained by Examples 22–26 when employing different salts for the electrolyte are illustrated in

EXAMPLE 27

Amorphous manganese dioxide and conductive carbon were mixed in a mixing ratio of 8:2 by weight. Thus obtained mixture was mixed with an NMP solution in which 15% by weight of PVdF was dissolved to prepare a slurry. The slurry was coated on a current collector of a titanium foil having a size of 3cm×3cm and was completely dried in a drier to manufacture an electrode.

Pyrrole monomer was completely dissolved in an acetonitrile solution so that the concentration of thus obtained solution was 0.3M. TEATFB was added as an additive into thus obtained solution and was stirred for a complete dissolution. The amount of TEATFB was controlled to obtain a 0.1M solution.

A previously prepared electrode of the metal oxide pseudocapacitor was dipped into thus obtained solution and was stood for a sufficient time in order to the solution might completely penetrate into the inner portion of the electrode.

After that, a polymerization reaction was carried out by a constant voltage method by which 0.5 V was kept with a reference electrode of Ag/AgCl for about 30 minutes. After completing the polymerization reaction, the electrode was washed with the acetonitrile solution for several times and was dried at room temperature to manufacture an electrode coated with the conducting polymer.

EXAMPLE 28

An electrode coated with the conducting polymer was manufactured by implementing the same method described in Example 27, except that the polymerization reaction was implemented by a constant voltage method wherein the applied voltage was fixed at 0.7V.

EXAMPLE 29

An electrode coated with the conducting polymer was manufactured by implementing the same method described in Example 27, except that the polymerization reaction was implemented by a constant voltage method wherein the applied voltage was fixed at 1.0V.

Figure 6:
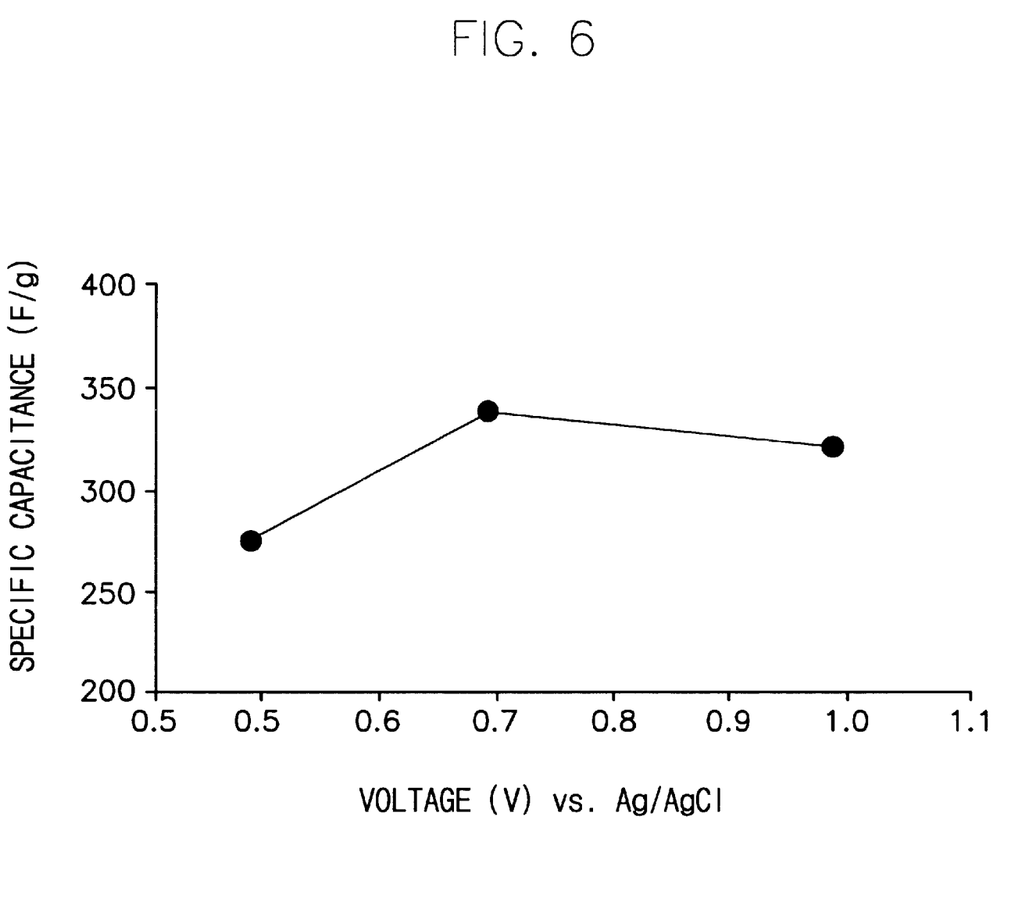
FIG. 6 is a graph illustrating specific capacitance values of electrodes obtained by changing applying voltage according to Examples 27–29.

FIG. 6 is a graph illustrating specific capacitance values of the electrodes obtained by changing the values of the applying voltages according to Examples 27–29. The specific capacitances were measured in a 1.0M solution of aqueous potassium chloride. It is confirmed that the highest specific capacitance is obtained when the applying voltage is 0.7V.

Figure 7:
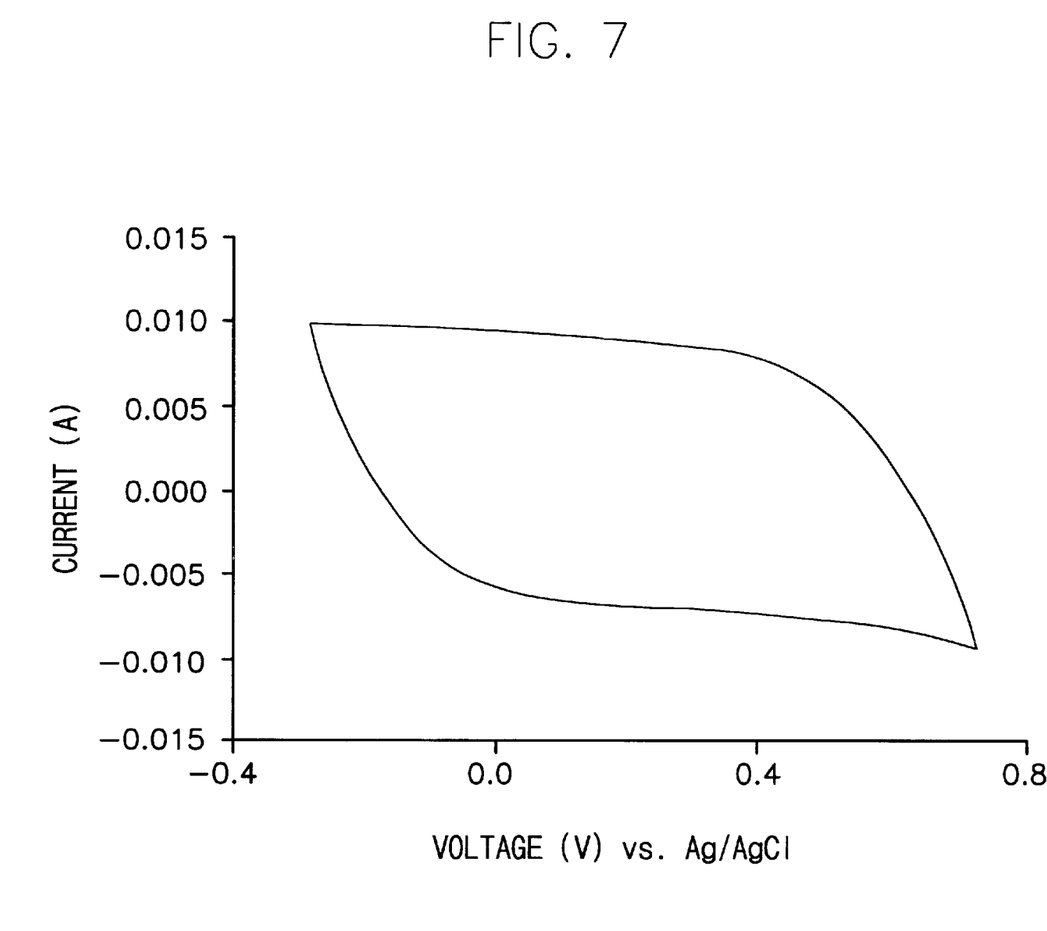
FIG. 7 is a graph illustrating a CV measuring result by using an electrode manufactured by Example 28 with a reference electrode of Ag/AgCl.

FIG. 7 is a graph illustrating a CV measuring result by using the electrode manufactured by Example 28 when applying 0.7V with a reference electrode of Ag/AgCl. It is confirmed that a tetragon-shaped current-voltage curve of an ideal capacitor is obtained.

EXAMPLE 30

Amorphous manganese dioxide and conductive carbon were mixed in a mixing ratio of 8:2 by weight. Thus obtained mixture was mixed with an NMP solution in which 15% by weight of PVdF was dissolved to prepare a slurry. The slurry was coated on a current collector of a titanium foil having a size of 3cm×3cm and was completely dried in a drier to manufacture an electrode.

Pyrrole monomer was completely dissolved in an acetonitrile solution so that the concentration of thus obtained solution was 0.3M. TEATFB was added as an additive into thus obtained solution and was stirred for a complete dissolution. The amount of TEATFB was controlled to obtain a 0.1M solution.

A previously prepared electrode of the metal oxide pseudocapacitor was dipped into thus obtained solution and was stood for a sufficient time in order to the solution might completely penetrate into the inner portion of the electrode.

After that, a polymerization reaction was carried out by adding 50 ml of 1.0M of aqueous ammonium sulfate as an oxidizing agent. After stirring for 5 hours or more the polymerization reaction was completed to manufacture an electrode coated with the conducting polymer.

Figure 8:
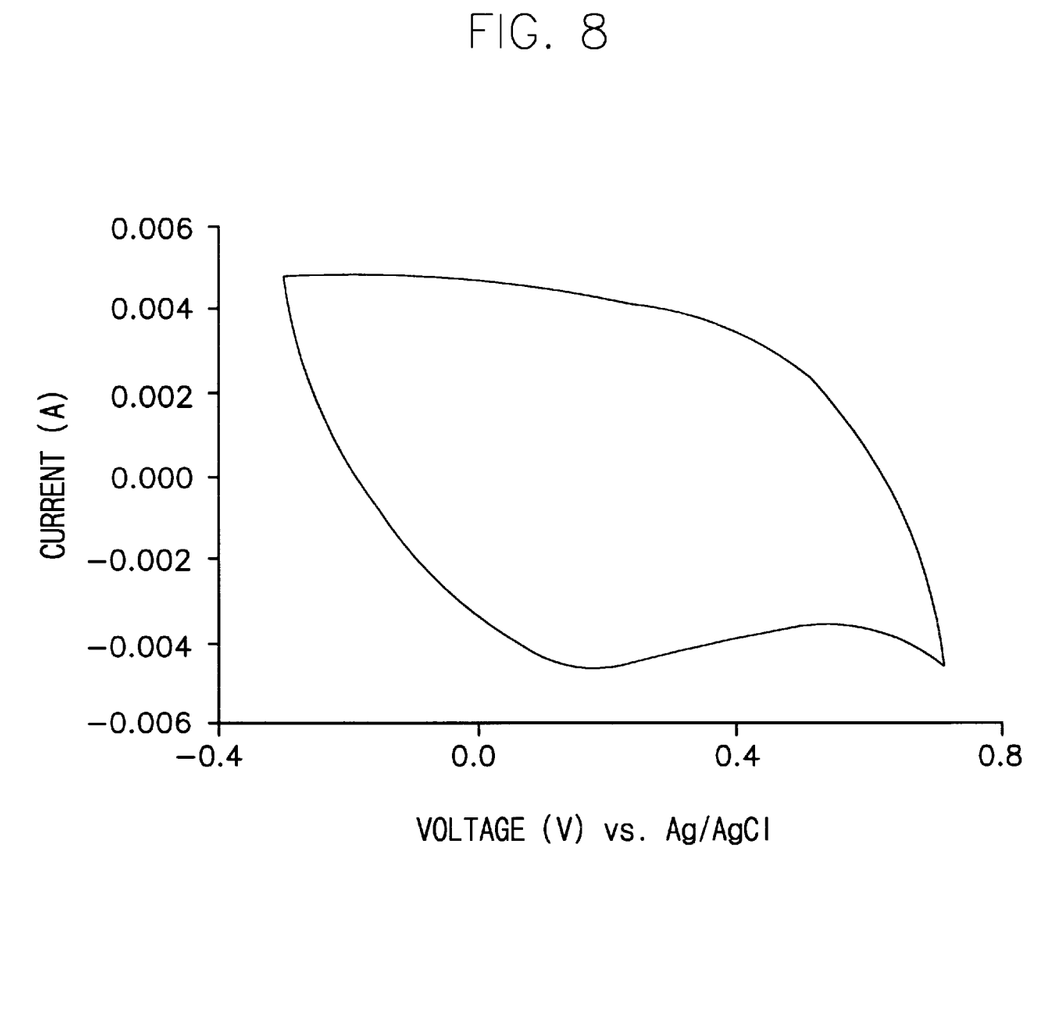
FIG. 8 is a graph illustrating a CV measuring result by using an electrode manufactured by Example 30 with a reference electrode of Ag/AgCl.

FIG. 8 is a graph illustrating a CV measuring result by using an electrode manufactured by Example 30 when using 1.0M of aqueous potassium chloride solution as an electrolyte with a reference electrode of Ag/AgCl.

EXAMPLE 31

15 ml of pyrrole monomer was added into 200 ml of distilled water and thus obtained mixture was stirred for a homogeneous mixing. 10 g of sodium salt of para-toluenesulfonic acid was added into the solution and then the solution was stirred to dissolve the salt completely.

20 g of amorphous manganese dioxide was added to 400 ml of distilled water and this solution was stirred for a homogeneous dispersion.

The two solutions were mixed and stirred for a sufficient time period. After that, 100 ml of 1.0M of aqueous ammonium sulfate solution was added to polymerize the pyrrole monomer. The polymerization reaction was carried out for about 5 hours or more while stirring. After completing the polymerization reaction, thus obtained powder was filtered, washed with distilled water for several times and dried at room temperature.

Thus prepared amorphous manganese dioxide coated with the conducting polymer as an active material and conductive carbon were mixed in a mixing ratio of 8:2 by weight. Thus obtained mixture was mixed with an NMP solution in which 15% by weight of PVdF was dissolved to prepare a slurry. The slurry was coated on a current collector of a titanium foil and was completely dried in a drier to manufacture an electrode.

Figure 9:
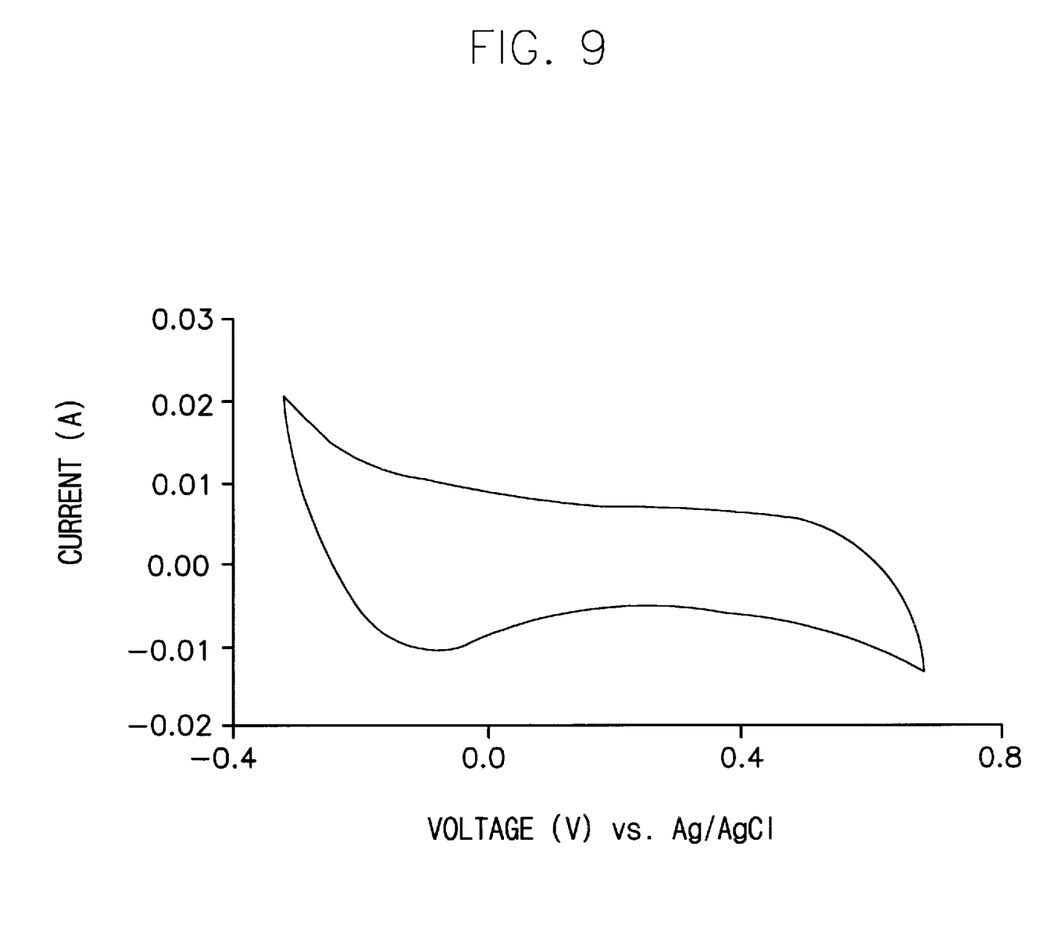
FIG. 9 is a graph illustrating a CV measuring result by using an electrode manufactured by Example 31 with a reference electrode of Ag/AgCl.

FIG. 9 is a graph illustrating a CV measuring result by using the electrode manufactured by Example 31 when using 1.0M of aqueous solution of potassium chloride as an electrolyte with a reference electrode of Ag/AgCl.

As described above, when a pseudocapacitor is manufactured by using the electrode of the metal oxide electrochemical pseudocapacitor coated with the conducting polymer according to the present invention, an equivalent series resistance is decreased and an energy density is increased through an increase of the number of active sites where an electrochemical reaction can be carried out. In addition, the dependency of the performance of the capacitor on the degree of dispersion of an active material and conductive carbon is reduced. The effect of the present invention will be described in detail with each item.

a. Decrease of the Equivalent Series Resistance of the Capacitor

The equivalent series resistance (ESR) means the sum of every kinds of resistances when measuring the resistance of the capacitor. When metal oxide having a low electric conductivity is used as the active material of the metal oxide electrochemical pseudocapacitor, the value of the ESR is very high. Therefore, carbon or graphite is added as a conductive material in order to lower the ESR. However, the change of the ESR is largely dependent on the degree of the dispersion of the conductive material. The contact between the particles of the conductive material should be kept continuously and a channel of the conductive material formed by the contact between the particles of the conductive material should be developed well at the inner portion of an electrode. When a break portion of the channel is present, the ESR could not be further decreased at this portion. Even when the channel of the conductive material is developed well, the area through which electrons pass is decreased because the contact between the particles of the conductive material of a powder form is accomplished by a surface contact. As the result, the decrease of the ESR depends on the surface area.

As described in the present invention, when the conducting polymer is coated onto the electrode composed of metal oxide and a conductive material, an effect of connecting the broken portion of the channel of the conductive material can be accomplished. In addition, since the coated conducting polymer is present at the contacting portion of the powder particles of the conducting material, the area of the electron passage is enlarged to further decrease the ESR.

The most important factor deciding the ESR of the capacitor is the electric conductivity of metal oxide used as the active material. When metal oxide having a high electric conductivity is used as the active material, an electrode is manufactured without adding a separate conductive material. However, when the electric conductivity of metal oxide is low, a conductive material such as conductive carbon is added to complement the defect. The ESR is dependent on the electric conductivity of the active material for the former case, while being dependent on the electric conductivity of conductive carbon for the latter case. However, even when the active material having a high electric conductivity is used, the area for the electron passage is lessen by the contacting portion between the particles of the active carbon. Therefore, the higher ESR is illustrated that that expected based on the electric conductivity of active carbon. The increase of the ESR due to the contacting portion of the particles of the active material is inevitable even though conductive carbon is added.

When the conducting polymer is coated onto the electrode according to the present invention, the decrease of the area for the electron passage due to the contacting portion of the particles can be prevented. Since the conducting polymer is coated onto the contacting portion of the particles, the decreasing amount of the area for the electron passage can be reduced. As the result, an improvement of a high power performance of the capacitor is expected.

b. Increase of the Energy Density Through an Increase of the Number of the Active Sites The mechanism of storing electric energy of the metal oxide electrochemical pseudocapacitor is an electrochemical reaction occurring at the surface of the powder of metal oxide. This electrochemical reaction is carried out at a surface satisfying an appropriate condition. That is, the surface should contact both of the electrolyte and the electrons. The electrons generated from the current collector, moved along the channel of the conductive material and then reached the surface of metal oxide, can participate the electrochemical reaction. The surface of the powder of metal oxide, where satisfying this condition is called as the active site. When the number of the active site increases, the amount of the storing electric energy is increased. The active site is formed when the channel of the conductive material reaches the surface of the powder of metal oxide. Therefore, the number of the active site also depends on the degree of the dispersion and the developed degree of the channel of the conductive material. When the conducting polymer is coated onto the electrode according to the present invention, the powder of metal oxide is connected to the channel of the conductive material or directly to the current collector to form the active site and to increase the storing amount of the energy.

The operation of the pseudocapacitor is accomplished by the electrochemical reaction occurring at the surface of the active material. However, the electrochemical reaction is not carried out at the whole surface of the active material, but at the surface of the active material, where the electrons and active ions contained in the electrolyte meet simultaneously. The active ions contained in the electrolyte penetrate into the inner portion of the electrode and present at the surface portion of the electrode. However, the electrons exhibit different behavior. When an active material having a high electric conductivity is used, conductive carbon is mixed as described above. At this time, a passage for the electron movement to the surface of the active material is confirmed when conductive carbon is continuously connected from the current collector to the surface of the active material.

If the passage for the electron movement is not confirmed, the number of the electrons reaching the surface of the active material is decreased and then, the number of the active site formed at the surface of the active material is decreased. As the result, the energy density accomplished by the capacitor is inevitably decreased. When the conducting polymer is coated on the electrode according to the present invention, a passage for the electron movement between the surface of the particles of the active carbon separated from the carbon chain with the carbon chain can be confirmed. Therefore, the number of the active site is increased and the storing amount of the electric energy of the capacitor can be increased.

c. Decrease of the Dependency of the Capacitor Performance on the Degree of the Dispersion of Particles Expected effects on the ESR and the energy density of the capacitor when the conducting polymer is coated onto the electrode are described in Items a and b. The contents described in items a and b is as follows. When metal oxide having a low electric conductivity is used as the active material and conductive carbon is mixed to complement the deficiency, the ESR of thus manufactured capacitor is dependent on the degree of the dispersion of the two materials according to the mixing method and mixing condition. That is, when the degree of the dispersion is good, the carbon chain is developed well at the whole surface of the electrode and a low ESR and an increase of the active site and the energy density can be accomplished. However, when the degree of the dispersion is not good, the above-described effects could not be obtained.

When the conducting polymer is coated onto the electrode according to the present invention, the ESR and the energy density are not largely dependent on the degree of the dispersion of the two materials. The effect obtainable from the electrode having a high degree of dispersion is relatively small while, that obtainable from the electrode having a low degree of dispersion is relatively large. Therefore, the difference in the performance between them is not large. This is advantageous when considering reliability of the performance of the capacitor.

While the present invention is described in detail referring to the attached embodiments, various modifications, alternate constructions and equivalents may be employed without departing from the true spirit and scope of the present invention.

What is claimed is:

1. An electrode of a metal oxide electrochemical pseudocapacitor comprising a current collector and an active material coated on said current collector, said active material including metal oxide and being coated with a conducting polymer on a surface thereof, wherein said current collector includes a conductive material on a surface thereof.

2. An electrode of a metal oxide electrochemical pseudocapacitor as claimed in claim 1, wherein said conducting polymer is at least one selected from the group consisting of polypyrrole, polyaniline and polythiophene.

3. An electrode of a metal oxide electrochemical pseudocapacitor as claimed in claim 1, wherein said conductive material is carbon.

4. An electrode of a metal oxide electrochemical pseudocapacitor as claimed in claim 1, wherein said conducting polymer is coated on a surface of each particle composing said active material.

5. An electrode of a metal oxide electrochemical pseudocapacitor as claimed in claim 1, wherein said active material comprises manganese dioxide as a main component.

6. An electrode of a metal oxide electrochemical pseudocapacitor as claimed in claim 1, wherein said active material comprises amorphous manganese dioxide as a main component.

7. A metal oxide electrochemical pseudocapacitor comprising a plurality of electrodes according to claim 1, an electrolyte and a separator positioned between said electrodes to prevent a contact between said electrodes.

8. A metal oxide electrochemical psuedocapacitor as claimed in claim 7, wherein said electrolyte is at least one selected from the group consisting of potassium chloride (KCl), potassium sulfate ($K_2SO_4$), lithium chloride (LiCl), lithium sulfate ($Li_2SO_4$), sodium chloride (NaCl) and sodium sulfate ($Na_2SO_4$).

* * * * *